US006981031B2

(12) United States Patent
French et al.

(10) Patent No.: US 6,981,031 B2
(45) Date of Patent: *Dec. 27, 2005

(54) LANGUAGE INDEPENDENT MESSAGE MANAGEMENT FOR MULTI-NODE APPLICATION SYSTEMS

(75) Inventors: Steven Michael French, Austin, TX (US); Aidon Paul Jennery, Round Rock, TX (US); Joseph Herbert McIntyre, Austin, TX (US); James Richard Schoech, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 687 days.

This patent is subject to a terminal disclaimer.

(21) Appl. No.: 09/737,338

(22) Filed: Dec. 15, 2000

(65) Prior Publication Data

US 2002/0078169 A1 Jun. 20, 2002

(51) Int. Cl.[7] .............................................. G06F 15/16
(52) U.S. Cl. .................................... 709/218; 709/201
(58) Field of Search ............................... 709/227, 229, 709/223, 224, 217, 218, 206, 230, 203, 221, 709/238, 200, 201; 707/10, 3, 1, 103; 704/8; 719/318, 316, 312; 717/136; 716/4; 706/48; 700/63, 237; 718/100; 711/121; 715/513, 715/505

(56) References Cited

U.S. PATENT DOCUMENTS

| | | | |
|---|---|---|---|
| 5,243,519 A | | 9/1993 | Andrews et al. ........ 364/419.05 |
| 5,363,315 A | * | 11/1994 | Weiss et al. ................ 709/201 |
| 5,381,346 A | * | 1/1995 | Monahan-Mitchell et al. ... 709/201 |
| 5,390,335 A | * | 2/1995 | Stephan et al. ............. 709/221 |
| 5,418,888 A | * | 5/1995 | Alden .......................... 706/48 |
| 5,434,776 A | | 7/1995 | Jain ........................ 364/419.1 |
| 5,434,972 A | * | 7/1995 | Hamlin ...................... 709/238 |
| 5,524,212 A | * | 6/1996 | Somani et al. .............. 711/121 |
| 5,546,304 A | | 8/1996 | Marschner et al. .... 364/419.04 |
| 5,659,337 A | | 8/1997 | Tanaka et al. ............. 345/200 |
| 5,724,503 A | * | 3/1998 | Kleinman et al. .......... 719/318 |
| 5,778,356 A | | 7/1998 | Heiny ........................... 707/2 |
| 5,787,452 A | | 7/1998 | McKenna ................... 707/536 |
| 5,812,964 A | | 9/1998 | Finger ........................... 704/7 |
| 5,867,386 A | * | 2/1999 | Hoffberg et al. ............. 700/83 |

(Continued)

OTHER PUBLICATIONS www.omg.org/docs/security/99-01-03.doc; www.omg.org/docs/security/99-01-03.doc.*

(Continued)

Primary Examiner—Thong Vu
(74) Attorney, Agent, or Firm—Duke W. Yee; Marilyn Smith Dawkins; Betty Formby

(57) ABSTRACT

A method, system, and computer program product for managing results in a locale independent manner in a multi-node networked data processing system is provided. In one embodiment, a first node sends a command request to a second node. The command request contains a command and a locale in which the text of the result is desired. The first node receives the results of execution from the command request sent to and executed on the second node. The result generated by the second node in response to the command request includes one or more messages, wherein each message contains a unique message identifier, locale in which its associated text is stored, and text associated with the message. Responsive to a determination that the locale of the message text is in a locale different from a desired locale, the first node replaces the message text contained within the result with message text corresponding to the desired locale to produce a modified result and sends the modified result to the requesting client node.

18 Claims, 5 Drawing Sheets

U.S. PATENT DOCUMENTS

| | | | |
|---|---|---|---|
| 5,956,483 A * | 9/1999 | Grate et al. | 709/203 |
| 6,000,046 A | 12/1999 | Passmore | 714/57 |
| 6,047,327 A | 4/2000 | Tso et al. | 709/232 |
| 6,092,036 A * | 7/2000 | Hamann | 704/8 |
| 6,108,688 A * | 8/2000 | Nielsen | 709/206 |
| 6,119,079 A * | 9/2000 | Wang et al. | 704/8 |
| 6,151,690 A * | 11/2000 | Peeters | 714/701 |
| 6,230,198 B1 * | 5/2001 | Dawson et al. | 709/224 |
| 6,247,064 B1 * | 6/2001 | Alferness et al. | 719/312 |
| 6,263,370 B1 * | 7/2001 | Kirchner et al. | 709/230 |
| 6,311,214 B1 * | 10/2001 | Rhoads | 709/217 |
| 6,523,170 B1 * | 2/2003 | Cuomo et al. | 717/136 |
| 6,546,365 B1 * | 4/2003 | Gajda et al. | 704/8 |
| 6,571,271 B1 * | 5/2003 | Savitzky et al. | 709/200 |
| 6,584,487 B1 * | 6/2003 | Saboff | 718/100 |
| 6,584,601 B1 * | 6/2003 | Kodosky et al. | 716/4 |
| 6,643,650 B1 * | 11/2003 | Slaughter et al. | 707/10 |
| 6,704,743 B1 * | 3/2004 | Martin | 707/103 R |
| 6,757,869 B1 * | 6/2004 | Li et al. | 715/513 |
| 6,823,504 B1 * | 11/2004 | Sokolov | 717/136 |
| 6,826,591 B2 * | 11/2004 | French et al. | 709/201 |
| 6,842,767 B1 * | 1/2005 | Partovi et al. | 709/203 |

OTHER PUBLICATIONS

A Specification and Code Generation Tool for Message..—Charles Plinta Richard ; www.accelse.com/MTVBld_WhitePaper.pdf.*

Desiderata for Agent Communication Languages—Mayfield, Labrou, Finin (1995) ; archive.cs.umbc.edu/pub/DARPA/kqml/papers/sss95.ps.*

Reliability with CORBA Event Channels—Defago, Felber, Garbinato.. (1997) ; Isewww.epfl.ch/Documents/postscript/DFG+97.ps.*

LO and Behold! Concurrent Structured Processes—Andreoli, Pareschi (1990) www.rxrc.xerox.com/people/andreoli/publications/Documents/P12158/content/dist.ps.gz.*

CORBA & DSA: Divorce or Marriage?—Pautet, Quinot, Tardieu (1999) www.infres.enst.fr/~quinot/publis/ae99.ps.*

Representing Logic Program Schemata in lambdaProlog—Gegg-Harrison ; cssun.winona.msus.edu/~tsg/publications/iclp95.ps.gz.*

DMQL: A Data Mining Query Language for Relational Databases—Han, Fu, Wang, Koperski.. (1996) www.cs.ualberta.ca/~zaiane/postscript/dmql96.pdf.*

Virtual Environments at Work: ongoing use of MUDs in the Workplace—Churchill (1999) www.fxpal.com/PapersAndAbstracts/papers/chu99.pdf.*

Dynamic Matching and Scheduling of a Class of Independent..—Maheswaran, al. (1999) www.mshn.org/publications/../pubs/DynamicMatching_Mahes_Ali_Siegel.ps.*

End-to-End Scheduling to Meet Deadlines in Distributed Systems—Bettati, Liu (1992) www.cs.tamu.edu/faculty/bettati/Papers/icdcs92.paper.ps.Z.*

* cited by examiner

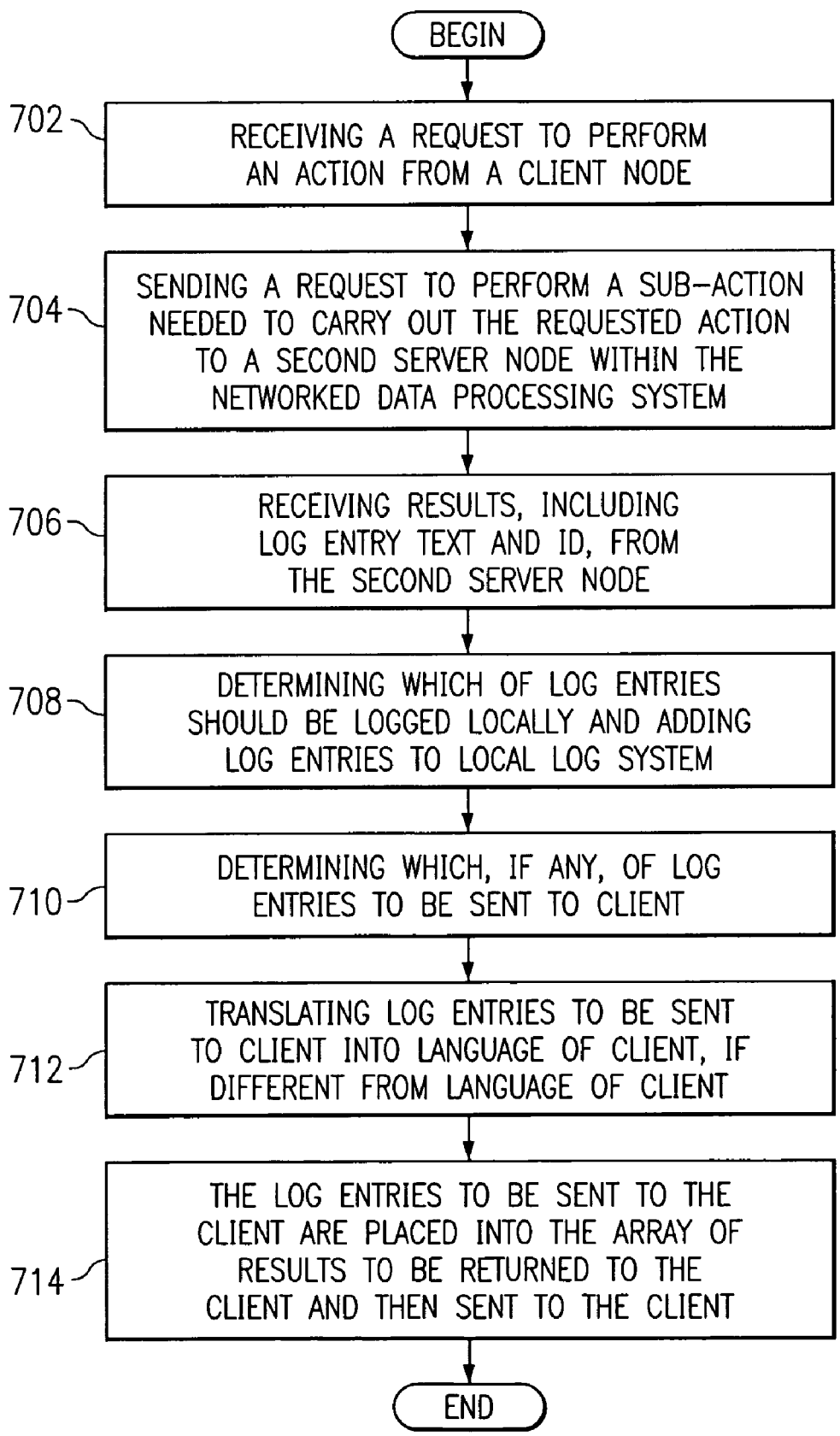

LANGUAGE INDEPENDENT MESSAGE MANAGEMENT FOR MULTI-NODE APPLICATION SYSTEMS

BACKGROUND OF THE INVENTION

1. Technical Field

The present invention relates to an improved networked data processing system and, more particularly, to language translation of messages generated in the system.

2. Description of Related Art

With the increasing globalization of business, many businesses may find that their computing IT resources are distributed across several countries with servers in one country generating messages and log files in one locale and computers in another country generating messages and log files in a different locale. A locale represents a specific geographical, political or cultural region and encapsulates the information necessary for text to be translated correctly for that locale. Such differences in locale may not be a problem for applications that are executed on a single computer.

However, many software applications are designed such that some processes are executed on one computer while other processes are executed on another computer with the results combined at perhaps still another computer. Each sub-process running on a computer may generate a set of messages and/or log files, perhaps related to errors generated during the execution of the sub-process. Many of these messages and/or log files may need to be sent back to the originating computer. However, currently, the slave computer executing the sub-processes may not know the locale of the originating computer if the originating computer is more than once removed from the computer executing the sub-processes. Therefore, messages and/or log files generated by the computer executing the sub-processes that are passed back to the originating computer are provided in the locale of the slave computer rather than the locale of the originating computer. Thus, an IT manager may be unable to ascertain key pieces of information due to language barrier.

Therefore, it would be desirable to have a message and log management system for providing information to an originating computer in the locale of the originating computer regardless of the locale of the slave computer.

SUMMARY OF THE INVENTION

The present invention provides a method, system, and computer program product for managing results in a locale independent manner in a multi-node networked data processing system. In one embodiment, a first node sends a command request to a second node. The command request contains a command and a locale in which the text of the result is desired. The first node receives the results of execution from the command request sent to and executed on the second node. The result generated by the second node in response to the command request includes one or more messages, wherein each message contains a unique message identifier, locale in which its associated text is stored, and text associated with the message. Responsive to a determination that the locale of the message text is in a locale different from a desired locale, the first node replaces the message text contained within the result with message text corresponding to the desired locale to produce a modified result and sends the modified result to the requesting client node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a diagram illustrating program flow for manipulating log entries for a distributed application in a multi-node networked data processing system in accordance with the present invention.

DETAILED DESCRIPTION OF THE PREFERRED EMBODIMENT

Figure 1:
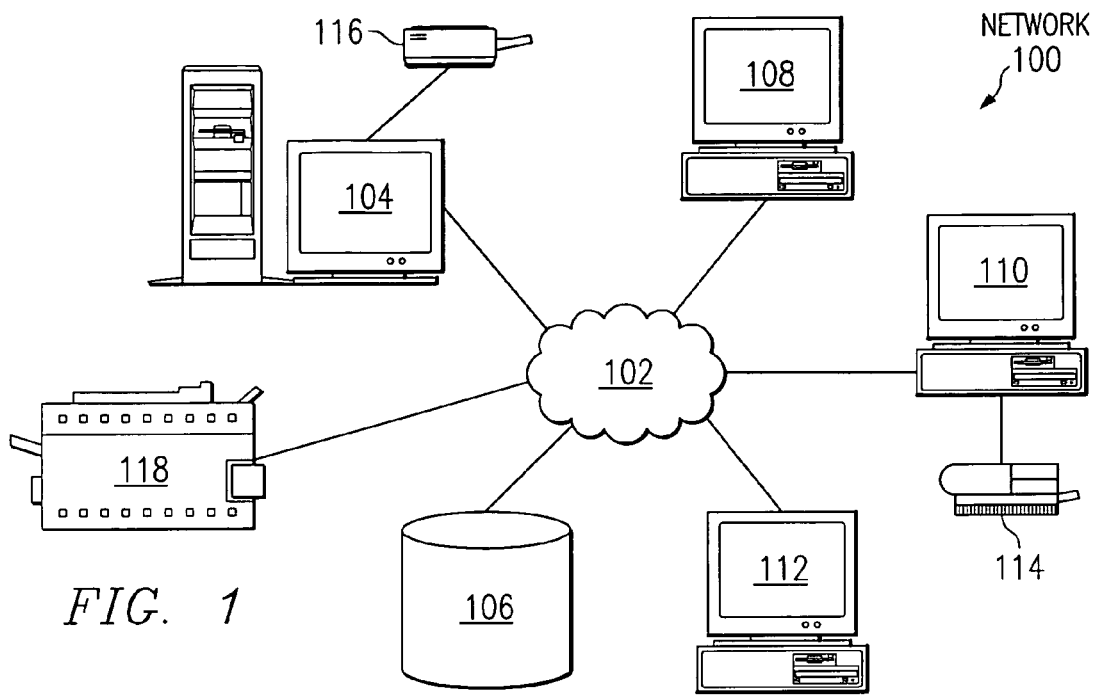
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
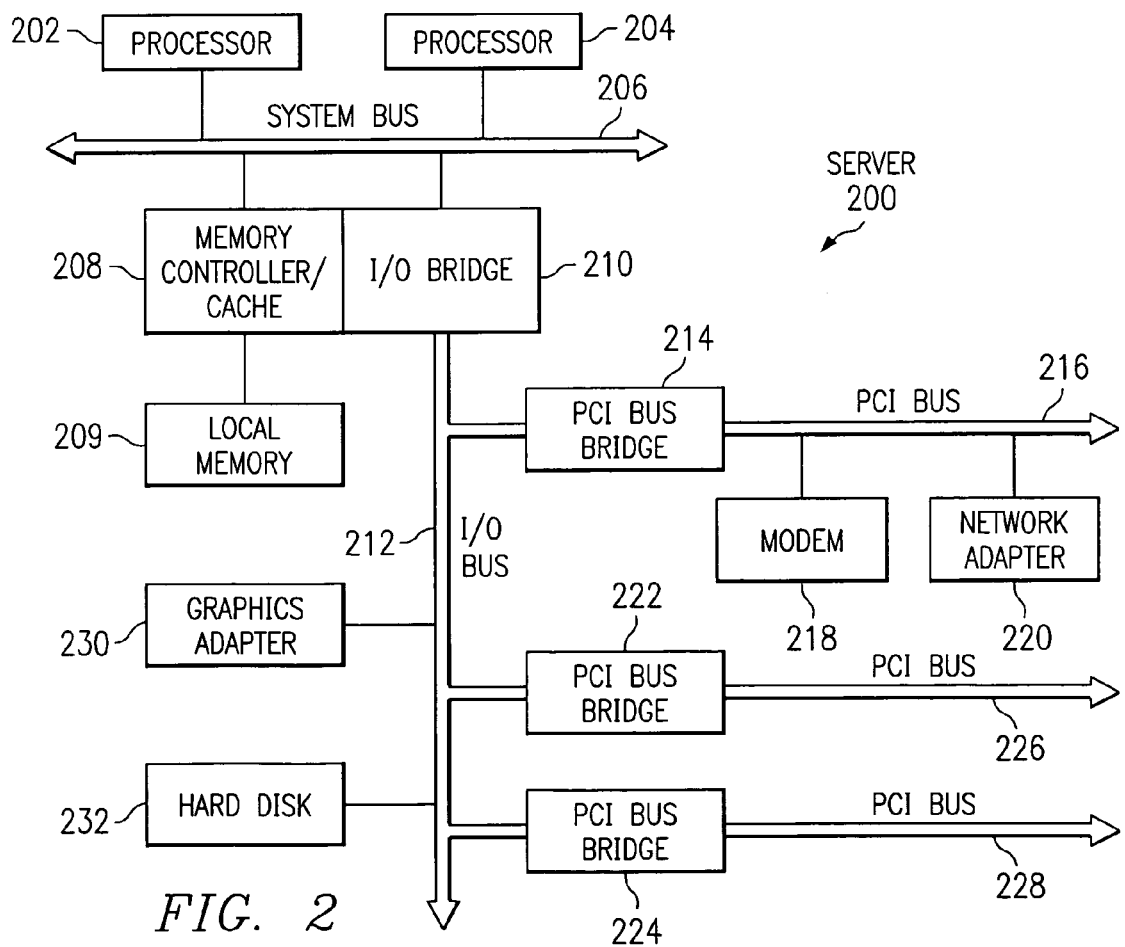
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
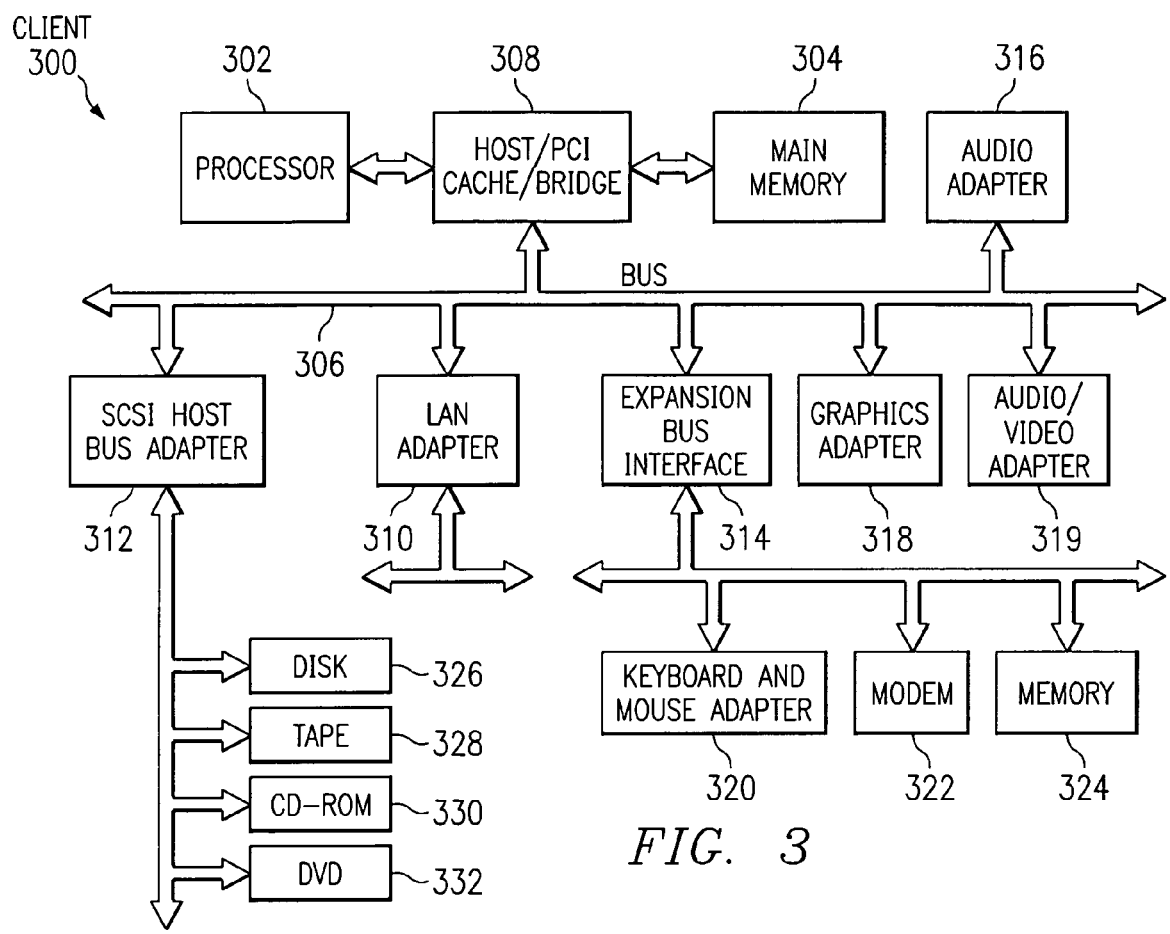
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
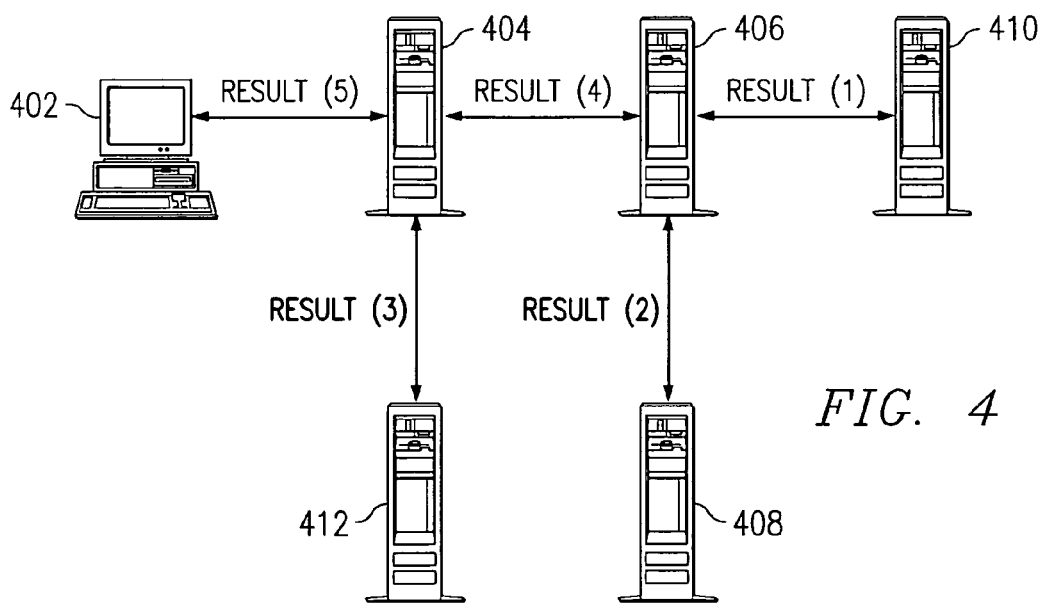
FIG. 4 depicts pictorial diagram illustrating a distributed message and logging system in accordance with the present invention.
Figure 5:
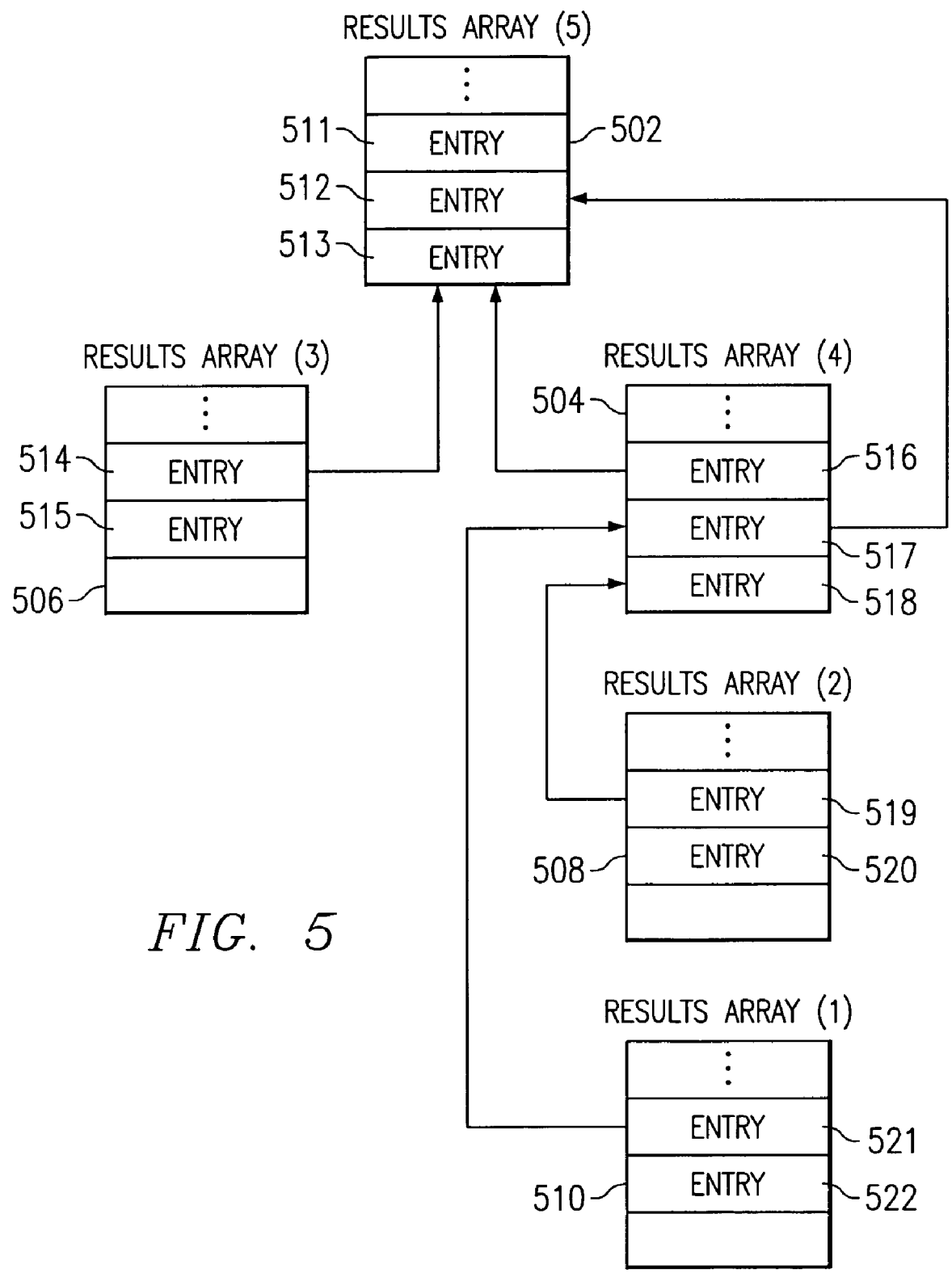
FIG. 5 depicts a block diagram illustrating results arrays for returning results, messages, and log information to a calling node.

Referring now to FIGS. 4–5, FIG. 4 depicts a pictorial diagram illustrating distributed processing of an application task in accordance with the present invention and FIG. 5 depicts a block diagram illustrating status tables and results fields for managing errors encountered by various nodes in performing the distributed task in accordance with the present invention. FIGS. 4–5 together illustrate the novel distributed data processing result manipulation technique of the present invention. In the present invention, results from a piece of a distributed application executed on one node and returned to an upstream node can be manipulated, for example, by translating messages and/or log files into the locale of a requesting client 402 and by modifying or appending results from one node onto results for the upstream node. Client 402 may be implemented, for example, as data processing system 300 in FIG. 3. Each of nodes 404–412 may be a server connected to a network, such as network 102 in FIG. 1 and implemented as, for example, data processing system 200 in FIG. 2.

In a distributed application, client 402 may request a task to be performed by node 404 and in the processing required to complete an application task, node 404 may parcel out sub-tasks for execution on a number of different nodes 406–412. Errors encountered by one of the parceled processes should be reported on the node 406–412 where the process is executing, on the node 404 from which the application task was initiated, and possibly to the requesting client 402. Such reporting is enabled for National Language Support (NLS) so that errors can be reported in each node's 402–412 configured locale. The work vended to one node 406–412 is independent of that vended to another 406–412; all pieces can proceed in parallel and are subject to independent error conditions that may be encountered on each node 406–412.

A result 502–510 is created on each secondary node 404–412 and sent to the node immediately upstream in the chain of nodes. In the distributed application, the results 504–510 contains result data needed to be used by the upstream node 404 as well as messages, such as, for example, error messages, and also may contain potential log entries.

Since the various nodes 404–412 may use different locales (e.g. U.S. English, U.K. English, Spanish, French, and German) and a client 402 connected to node 404 may use still another locale from some of the nodes 404–412 in the network, messages returned to node 404 are translated into the locale of the client, by node 404, by retrieving a message text string corresponding to the message ID for the appropriate client locale. If a message does not have a message ID, or if the message ID is unrecognized by node 404, then node 404 passes the untranslated message text string to the initiating client. Thus, even in the worst case scenario, the initiating client receives some feedback from downstream nodes 404 and 406 even if a translation of the message is not available from node 404.

As parcels of work (i.e. application sub-tasks) are completed, the results arrays 502–510 are sent back to the originating node. Each results array 502–510 contains entries 511–522, wherein each entry reflects a result needed by the requesting node or reflects a message or potential log entry. Upon receipt of a results array 502–510, the receiving node 404–412 may take all, part, or none of the entries from the results array 502–510 and place these entries into an entry in its own results array 502–510 to be passed to its requesting node. Furthermore, the entries from the received results array 502–510 may be modified, translated, and/or appended to other entries by the receiving node. If an entry contains log information, the receiving node 404–406 may place the log information into its own log file either modified or unmodified and may also pass the log information on to the node upstream from the receiving node as an entry in its own results array.

Thus, in the depicted example, node 406 receives results array (1) 510 from node 410 and results array (2) 508 from node 408. Results array (1) contains, among other entries, entries 521 and 522 and results array (2) contains, among other entries, entries 519 and 520. Node 406 takes entry 519 from results array (2) 508 and places it into an entry 518 within its own results array (4) 504. Node 406 also takes entry 521 from results array (1) 510 and places it within its own results array (4) 504. Entries 520 and 522 are not placed into results array (4) 504, however, the information contained within entries 520 and 522 may be utilized by node 406 to generate other messages or results that may be placed into its results array (4) 504. Also, if entries 520 or 522 contain log information, this information may be added to a log file generated by and stored on node 406 for its own purposes. For example, if the calling node 406 recognizes that one of the log entries is always generated by the secondary node 410 or 408, the calling node 406 may withhold this information from the calling node 404 rather than writing or passing the information to the calling node 404, since this information is unimportant to the calling node 404.

Similarly, upon receipt of responses 504–506, node 404 consolidates some, all, or none of the entries 514–518 from results arrays 504 and 506 and adds its own entries to results array 502 which is sent back to the requesting client 402. In the depicted example, node 404 takes the information from entry 517 and places into its own results array (5) 502 as entry 512. This information may be entered in entry 512 exactly as it appeared in entry 517 or it may be modified, for example, by appending other information to it or by translating the entry from the locale node 406 into the locale of the requesting client 402.

Some of the entries 514–518 may contain log data. Node 404 may take this log data and add it to its own log. The log information may also be modified by replacing text generated in one locale with corresponding text matching the locale of the node 404. Also, the log information may be appended to other log information or a new log entry may be generated based on the information in the log data received from one of the entries 514–518. To aid in translating entries from one locale to another, each entry 511–522 may include message text and a message ID corresponding to the message or log text. The message ID may be used by the node to identify corresponding translated message text that may be inserted in place of the original message text. These modified log entries may be added to the nodes 404 own log file and/or may be forwarded to the requesting client 402. However, typically, log entries contain information not useful to the user of the requesting client 402 and would not be forwarded as an entry in results array (5) 502 to the requesting client 402.

Similarly, the calling node 404 may write part, all, or none of the log information received from secondary nodes 406–412 into its own log. The calling node 404 may, as desired, write part, none, or all of entries received from nodes 406 and 412 to its results array 502 to be sent to the initiating client 402. The logging system of the present invention provides a distributed log with log information contained on each node, thus providing each individual node more control over the contents of the log as well as providing a log on the initiating node 404 that may contain only information the node 404 determines is important for the initiating client 402.

Thus, one aspect of the present invention provides that a single error occurrence is reported to both the node where the error occurs and on the node that originated the distributed work request. On each node, the error is reported to the display terminal and/or in an error log file. The node receiving a result containing log information may write all, part, or none of the log contents to its own log. The node receiving the log information may forward the log information to its calling node in its received form, may modify the log information, or may substitute alternative information within the result. Log entries are recorded as message identifiers plus replacement text plus plain text, allowing log entries to be recorded in the locale of the node where the log is written.

To aid in understanding the present invention, suppose that node 410 is a Japanese node, node 404 is a French node, node 408 if a Spanish node, and node 406 is a German node and consider the following simple example where the nodes 402–408 in the FIG. 4 each generate one message for the result messages, and where the Japanese 410 and French nodes 404 have US English translations installed for their result messages, but where the Spanish 408 and German nodes 406 do not.

The Japanese node 410 creates a result(1) containing message 1000, with replacement parameters 10 and 90, and produces the US English version of the message in the message text field.

The Spanish node 408 creates a result(2) containing message 1211, with replacement parameter 80, and produces the Spanish version of the message in the message text field, since it does not have a US English version available.

The German node 406 creates a result(3) containing message 9415, with replacement parameter C:\, and produces the German version of the message in the message text field, since it does not have a US English version available.

The French node 404 creates a result(4) containing message 1452, with replacement parameter D:\, and produces the US English version of the message in the message text field.

In preparing the message to return to the client 402, the French node 404 will process each message contained within the result to generate US English messages. In the case of the message generated by the German node 406, if the French node 404 does not have a US English translation for the message, then it will pass through the German text. If it does have a translation, US English will be substituted. Likewise for the message for the Spanish node 408.

Where the nodes 402–410 in an application system share a common message library, the text for a message does not need to be filled in by the node producing the message when it knows there is a node in the return stream that will be able to provide the translation for the message. In the case where the message is not from the common message library, the text should be filled in. This optimization is common for systems that have multiple nodes, and where the nodes have master/slave relationships—the slave can make this optimization with knowledge that its caller has this translation capability.

Figure 6:
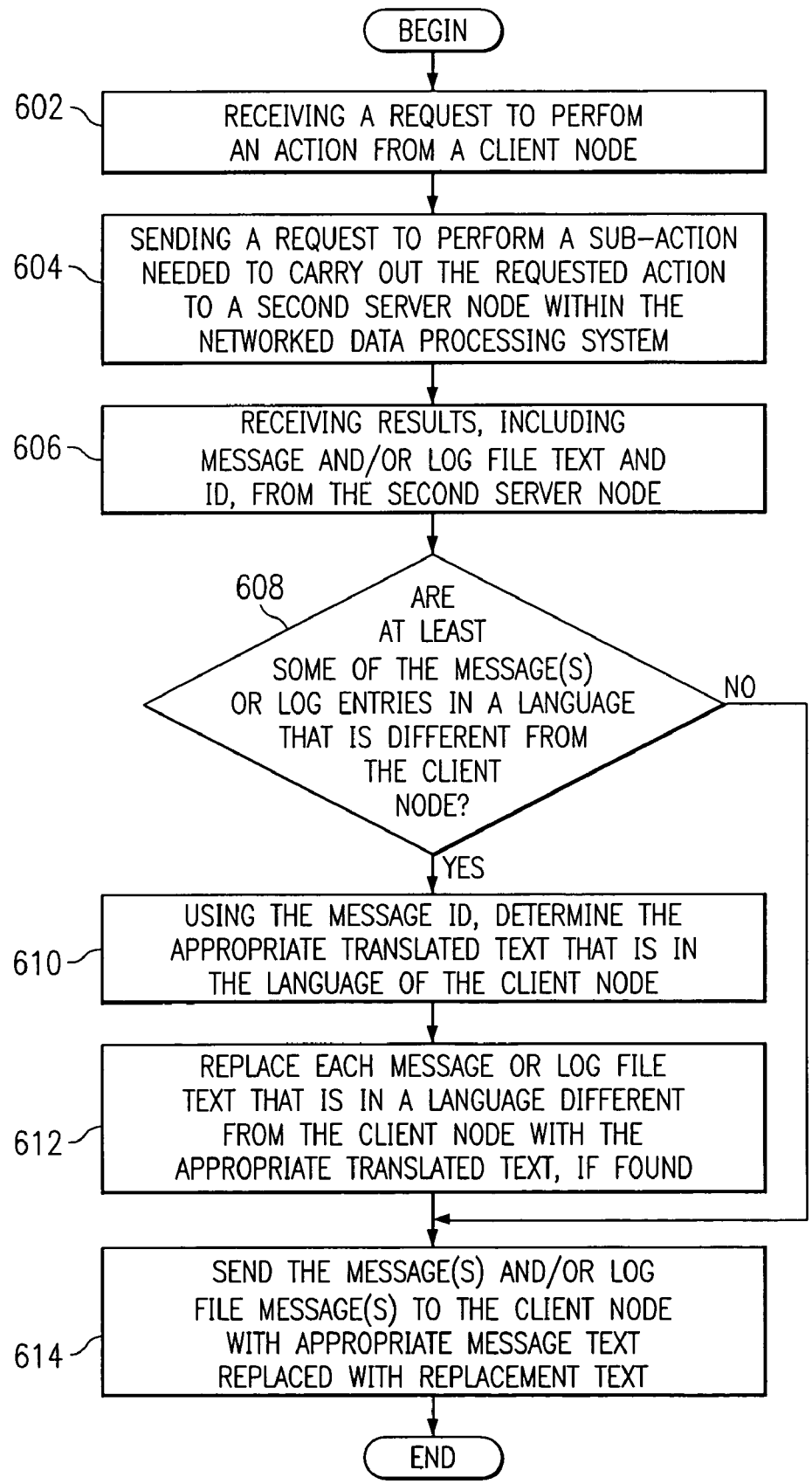
FIG. 6 depicts a diagram illustrating program flow for message translation in accordance with the present invention.

With reference now to FIG. 6, a diagram illustrating program flow is depicted in accordance with the present invention. A server, such as server 402 in FIG. 4 receives a request to perform an action from a client node (step 602). The server sends a request to perform a sub-action needed to carry out the requested action to a second server node within the network, such as, for example, network 100 in FIG. 1 (step 604). The first server then receives the results, including result messages and/or log messages, from the second server node (step 606). If the result message(s) and/or log message(s) are in the locale of the client node (step 608), then the first server does not need to translate the result message(s) and/or log message(s) and merely sends the result message(s) and/or log message(s) to the client node (step 614).

If the result message(s) and/or log message(s) are in a locale that is different from the locale of the client node (step 608), then, using the message ID, the server determines the appropriate translated text that is in the locale of the client node (step 610). The server then replaces each result message or log message text that is in a locale different from the client node with the appropriate translated text, if that translated text is found (step 612). The first server then sends the result message(s) and/or log message(s) to the client node with the appropriate result message or log message text replaced with translated text (step 614). If no replacement text is found, then the first server sends the result message(s) or log message(s) to the client node unmodified.

With reference now to FIG. 7, a diagram illustrating program flow for manipulating log entries for a distributed application in a multi-node networked data processing system is depicted in accordance with the present invention. To begin, a primary server node in the networked data processing system receives a request to perform an action from a client node (step 702). The primary server node sends a request to perform a sub-action needed to carry out the requested action to a second server node within the networked data processing system (step 704). The primary server node then receives the results, including log entry text and ID, from the second server node (step 706). The primary server node determines which of the log entries should be logged locally and adds the appropriate log entries, if any, to the local log system (step 708). Those of ordinary skill in the art will appreciate that the local log system may be implemented in various ways without affecting this invention. Some operating systems include more than one type of log file (within the local log system) based on the type of information to be logged, for example: the system log, the application log and the security log (audit log). The target log to be used is often implied by the log ID (or message identifier). Also note that the log entries added to the local log system may be modified prior to entering them into the local log system. For example, if the log text is in a locale different from the locale of the primary server node, then the log entry text is replaced by appropriate translated log text determined by the log ID. Thus, for example, if the log ID is 20, the primary server node determines the log entry text corresponding to log ID 20 in the locale of the primary server node from a table of log Ids and translation text.

The primary server node then determines which, if any, of the log entries should be sent to the client (step 710). Any log entries that are to be sent to the client are translated into the locale of the client if the current locale of the log entry is different from the locale of the client (step 712). This translation is performed using the log ID as described above. The log entries to be sent to the client are placed into the array of results to be returned to the client and then sent to the client (step 714).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing results in a locale independent manner in a multi-node networked data processing system, the method comprising:

receiving, at a first node, a task to be performed sent from a client node connected with the first node, wherein the client node has a language of a first locale associated therewith and the task includes an identifier of the language of the first locale;

responsive to receiving the task, parceling, by the first node, the task into a plurality of sub-tasks that each may be independently executed, wherein the plurality of sub-tasks include a first sub-task;

conveying the first sub-task having the identifier of the first locale to a second node connected with the first node for processing of the first sub-task, wherein the second node has a language of a second locale associated therewith that is different than the language of the first locale;

responsive to receiving by the first node a first message resulting from completion of the first sub-task, translating, by the first node, the first message into the language of the first locale;

consolidating, by the first node, the first message translated into the language of the first locale and at least one message resulting from completion of a second sub-task processed by a third node into a results message; and sending the results message to the client node.

2. The method of claim 1, wherein the at least one message is in a language of a third locale that is different than the language of the first locale.

3. The method of claim 2, wherein the second sub-task is one of the plurality of sub-tasks, further comprising:
conveying, by the first node, the second sub-task and the identifier to the third node; and
responsive to completion of the second sub-task, returning, by the third node, the at least one message to the first node.

4. The method of claim 1, wherein the at least one message is in a language of a third locale that is different than the language of the first locale, the method further comprising:
responsive to the first node receiving the at least one message from the third node, translating, by the first node, the at least one message into the language of the first locale.

5. The method of claim 4, wherein the at least one message is in a language of a third locale that is different than the language of the first locale, wherein the step of consolidating further comprises:
inserting, into the results message, the first message translated into the language of the first locale; and
inserting, into the results message, the at least one message translated into the language of the first locale.

6. The method of claim 1, wherein the step of consolidating further comprises:
inserting, into the results message, the first message translated into the language of the first locale; and
inserting, into the results message, the at least one message in a language of a third locale of the third node that is different than the language of the first locale.

7. A computer program product in a computer readable medium for managing results in a locale independent manner in a multi-node networked data processing system, the computer program product comprising:
first instructions at a first node that receive a task to be performed sent from a client node connected with the first node, wherein the client node has a language of a first locale associated therewith and the task includes an identifier of the language of the first locale;

responsive to receiving the task, second instructions at the first node that parcel the task into a plurality of sub-tasks that each may be independently executed, wherein the plurality of sub-tasks include a first sub-task;

third instructions that convey the first sub-task having the identifier of the first locale to a second node connected with the first node for processing of the first sub-task, wherein the second node has a language of a second locale associated therewith that is different than the language of the first locale;

fourth instructions that, responsive to receiving by the first node a first message resulting from completion of the first sub-task, translate at the first node the first message into the language of the first locale;

fifth instructions at the first node that consolidate the first message and at least one message resulting from completion of a second sub-task processed by a third node into a results message; and sixth instructions that send the results message to the client node.

8. The computer program product of claim 7, wherein the at least one message is in a language of a third locale that is different than the language of the first locale.

9. The computer program product of claim 8, wherein the second sub-task is one of the plurality of sub-tasks, the computer program product further comprising:
seventh instructions that convey the second sub-task and the identifier to the third node from the first node; and
eighth instructions that, responsive to completion of the second sub-task, return the at least one message from the third node to the first node.

10. The computer program product of claim 7, wherein the at least one message is in a language of a third locale that is different than the language of the first locale, the computer program product further comprising:
seventh instructions that, responsive to the first node receiving the at least one message from the third node, translate the at least one message into the language of the first locale.

11. The computer program product of claim 10, wherein the fifth instructions further comprise:
eighth instructions that insert, into the results message, the first message translated into the language of the first locale; and
ninth instructions that insert, into the results message, the at least one message translated into the language of the first locale.

12. The computer program product of claim 7, wherein the fifth instructions further comprise:
seventh instructions that insert, into the results message, the first message translated into the language of the first locale; and
eighth instructions that insert, into the results message, the at least one message in a language of a third locale of the third node that is different than the language of the first locale.

13. A network of data processing systems for managing results of a distributed application in a locale independent manner, the network comprising:
a client node that generates a task to be performed, wherein the client node has a language of a first locale associated therewith and the task includes an identifier of the language of the first locale;
a first node connected with the client node that receives the task from the client node and parcels the task into a plurality of sub-tasks that each may be independently executed, wherein the plurality of sub-tasks include a first sub-task; and a second node connected with the first node that receives the first sub-task having the identifier of the first locale and, wherein the second node has a language of a second locale associated therewith that is different than the language of the first locale, and wherein the second node, responsive to receiving and completing the first sub-task, sends, to the first node, a first message in a language of a second locale that is different than the language of the first locale, and the first node, responsive to receiving the first message translates the first message into the language of the first locale, wherein the first node consolidates the first message and at least one message resulting from completion of a second sub-task of the plurality of sub-tasks into a results message and sends the results message to the client node.

14. The network of claim 13, wherein the at least one message is in a language of a third locale that is different than the language of the first locale.

15. The network of claim 14, wherein the first node conveys the second sub-task and the identifier to a third node connected with the first node that, responsive to completion of the second sub-task, returns the at least one message to the first node.

16. The network of claim 13, wherein the at least one message is in a language of a third locale that is different than the language of the first locale, and wherein the first node, responsive to receiving the at least one message from the third node, translates the at least one message into the language of the first locale.

17. The network of claim 16, wherein the first node consolidates the first message and the at least one message by inserting into the results message the first message translated into the language of the first locale, and inserting into the results message the at least one message translated into the language of the first locale.

18. The network of claim 15, wherein the first node consolidates the first message and the at least one message by inserting into the results message the first message translated into the language of the first locale, and inserting into the results message the at least one message in a language of a third locale of the third node that is different than the language of the first locale.

* * * * *